Oct. 12, 1965
C. H. KOOP
3,211,543
MOLD PATCH SUPPORT
Filed June 8, 1962
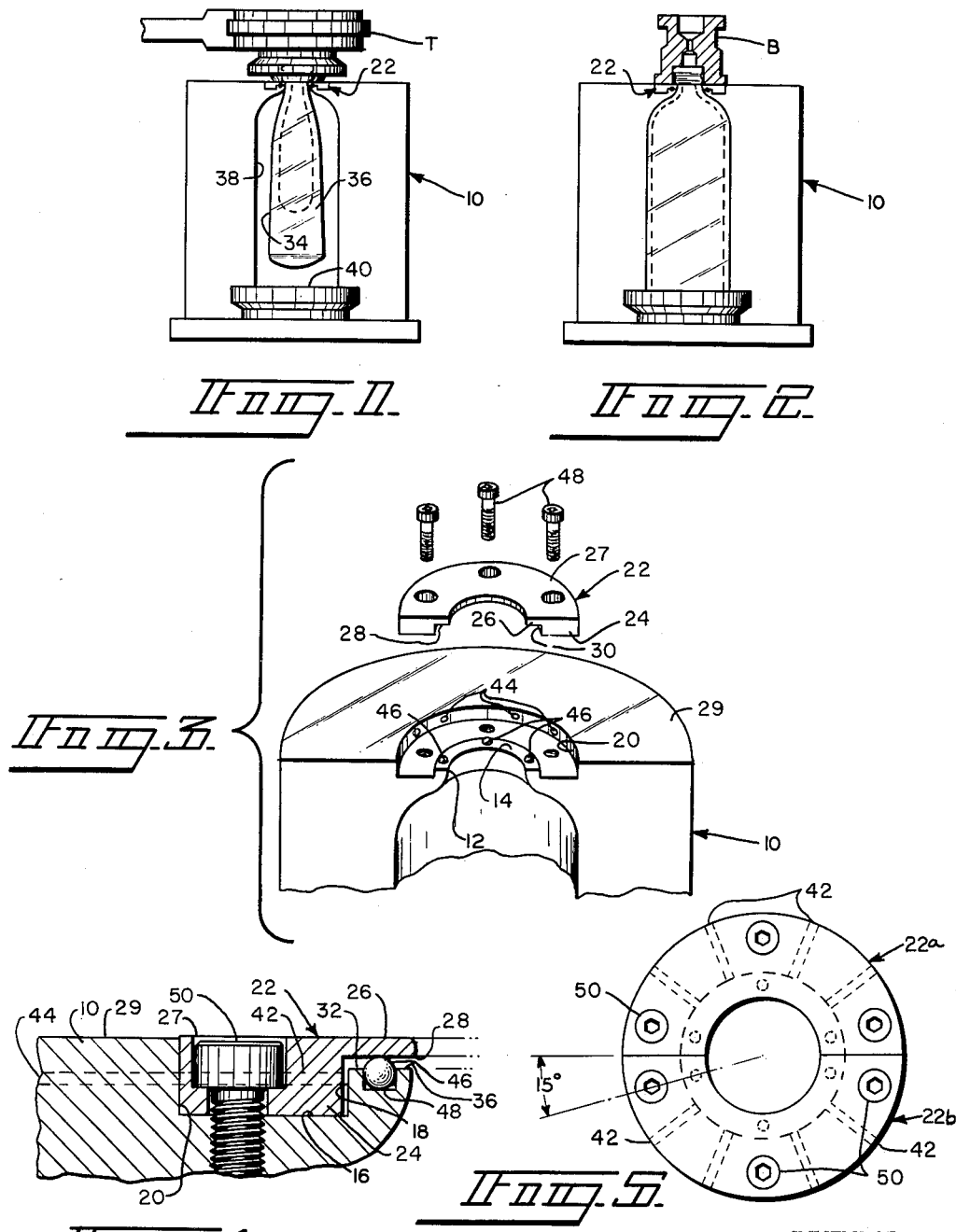
INVENTOR.
CHARLES H. KOOP
BY
DUANE C. BURTON
ATTORNEY United States Patent Office
3,211,543
Patented Oct. 12, 1965

3,211,543
MOLD PATCH SUPPORT
Charles H. Koop, Muncie, Ind., assignor to Ball Brothers Company, Inc., Muncie, Ind., a corporation of Indiana
Filed June 8, 1962, Ser. No. 200,988
5 Claims. (Cl. 249—141)

This invention relates generally to glass forming molds and more particularly to an improved mold construction whereby the operating life of the mold is increased.

Glass containers are generally formed in two steps. In the first step the finish, i.e., that part of the container for holding the cap or closure, is formed. This operation normally occurs in the blank mold. In the second step, the remaining portion of the body, i.e., the neck, shoulder, body and bottom, is formed. This operation takes place in the blow mold. After completion of the first step, the partially formed mass of glass or parison is transferred from the blank mold to the blow mold, and after the parison is reheated by the heat flowing from the interior to the exterior of the parison, a blow head is positioned on top of the blow mold and closes about the finish. Parenthetically, in the individual section machine, i.e., a sectional type machine in which each section is an independent and a complete manufacturing unit, the reheating occurs within the blow mold; however, in all other types of glass container forming machines the reheating occurs before the parison is positioned within the blow mold. Air is supplied through the blow head into the opening or bubble formed in the finish until the parison takes its final shape. Since the blow head is brought into sealing contact with the top of the blow mold body rapidly (up to fifteen times per minute) and with considerable force and since the blow mold bodies are expensive to replace, it has been found desirable to use a replaceable wear sustaining element or mold patch on top of the blow mold body.

In mold construction where venting is not required, the mold patch may be relatively simple in construction and substantially rectangular in cross-section. However, when the mold is required to be vented the difficulties are increased since not only is it necessary to provide a mold and mold patch construction capable of sustaining wear but it is also necessary to provide for adequate venting.

Therefore, the primary object of this invention is to provide a glass container forming mold which may be used for longer periods of time than conventional molds without repair or replacement thereof.

Another object of this invention is to provide glass container forming mold having a mold patch which is simple and efficient in operation and can be readily installed on existing mold bodies.

Another object of this invention is to provide a glass container forming mold having a novel mold patch and support therefor and means for providing substantially immediate and continuous venting of the interior of the mold while at the same time increasing the life of the mold patch itself.

Other objects and advantages of the invention will become apparent from the following detailed description of a preferred form thereof, reference being had to the accompanying drawings, in which:

FIGURE 1 is a side elevational view, with the mold open, immediately after parison transfer, a parison being shown in the mold;

FIGURE 2 is a side elevational view of a mold in contact with a blow head and indicating a finished bottle;

FIGURE 3 is an exploded perspective view of the top of a mold half and its mold patch and attaching and supporting devices;

FIGURE 4 is a fragmentary sectional view through a mold patch supported in accordance with the present invention; and FIGURE 5 is a top plan view of a mold patch incorporating the present invention.

In accordance with the present invention, the mold and mold patch are constructed in such a fashion as to provide a recess or opening around the neck or finish portion of a parison when the parison is positioned within the mold. Accordingly, the mold patch of the invention has a base portion and an inwardly extending flange portion which overlies and is spaced apart from a surface portion of the mold body, which is provided with a glass receiving opening. Fluid passageways are formed within the mold patch and/or the mold body. These fluid passageways communicate with one another and allow the air to pass from the interior of the mold body to the atmosphere without adversely affecting the quality of the finished container. Although this arrangement adequately vents any trapped gas, the use of a mold patch having an unsupported central portion of reduced thickness has resulted in a mold patch of comparatively short life, often less than 10–12 hours of operational use, since the severe treatment received by it as a result of being brought rapidly into sealing contact with the blow head (up to 15 times a minute) caused the corners of the patch to be knocked off or badly worn and in many cases to become permanently deflected. Therefore, in accordance with the invention, the inwardly extending flange portion of the mold patch is supported at spaced-apart points preferably through the use of convex curvilineal supporting elements.

Referring to the drawings, a glass forming mold 10 is shown having an opening 12 at one end through which glass is charged by a parison transfer head T (FIGURE 1) and through which blowing subsequently takes place by means of a blow head B (FIGURE 2). The mold 10 is provided with a pair of inwardly located recessed annular surfaces 14 and 16. Annular surface 14 surrounds the glass receiving opening 12 and is recessed to a lesser depth than annular surface 16. An annular chamber is defined by annular surface 16 which comprises the base thereof, inner wall surface 18 which terminates at the periphery of annular surface 14 and an outer peripheral wall surface 20.

The mold patch 22 has a body portion 24 substantially rectangular in cross-section and an inwardly extending flange portion 26 of limited thickness. As shown in FIGURE 4, the upper surface 27 of the mold patch 22 is substantially flush with the upper surface 29 of the mold body. The undersurface 28 of the inwardly extending thinner or flange portion 26 is spaced upwardly from the mold's recessed annular surface 14 and has its outermost extremity terminating at a vertical wall 30 which forms the inner wall of the mold patch body portion 24, so that there is provided a recess extending outwardly and downwardly about the periphery of the glass receiving opening 12 of the mold 10, thus forming an air vented chamber 32 to allow air from between the outer surface 34 of the parison 36 and the interior surfaces 38 and 40 of the mold body to escape during the blowing operation.

Air is exhausted from chamber 32 by means of a plurality of radially directed openings 42 formed in the body portion 24 of the mold patch 22 and communicating with said chamber 32. Aligned openings 44 are also formed in the mold body 10 in communicating relationship with the openings 42, said aligned openings 44 having their opposite ends open to the atmosphere thereby providing in combination with the venting chamber 32 means whereby air from the interior of the mold body may be exhausted.

In order to support the inwardly extending flange portion 26, support means 46 are provided and located between and in contact with the recessed annular surface 14 of the mold body 10 and the undersurface 28 of the flange. The support means 46 are preferably spaced equidistantly from one another and may comprise a plurality of elements over which the imposed load is more or less evenly distributed. It has been found that the imposed load can be distributed with comparative ease over a plurality of elements having a convex curvilineal configuration and good results have been obtained by using a plurality of balls as support means.

The mold patch in one preferred form is made in two semi-annular sections 22a and 22b, each substantially 180° in extent. The mold patch body portion 24 is positioned within but does not completely fill the chamber defined by mold surfaces 16, 18, and 20. The inwardly extending flange portion 26 overlies and is spaced apart from the mold's recessed annular surface 14. Said flange portion 26 of each semi-annular section of the mold patch is shown in FIGURES 4 and 5 as being supported by three hardened balls 46, each partially received in a socket 48 in the mold's recessed annular surface 14 and projecting therefrom a distance which depends on the size of the ball. A 0.125" ball may, for example, be received half in the socket leaving half of the ball projecting above the plane of the subjacent mold surface, or the socket depth may be such as to leave only about 0.010" of the height of the ball exposed. In FIGURE 5 one ball is positioned at the midline of the mold patch section and is thus equidistant from the ends, and the other balls are spaced quite close to the respective ends, being on a radius about 15° removed from the radial line dividing the adjacent end of the section. Hardened balls of the type used in ball bearings have been found to be well suited for the purpose of the present invention. However, since the balls act only as convenient supporting elements for the mold patch's thinner or flange portion 26, it will be understood that other support means having equivalent contacting areas may be used without departing from the invention. It should also be understood that the mold patch's thinner or flange portion 26 may be supported with more than three balls or supports, it being necessary primarily to distribute the imposed load over a wide area and to prevent shock or stress concentration in the flange portion 26.

In operation, sockets 48 are formed at the required intervals in the mold body 10, balls 24 are dropped in the sockets 48 and the mold patch sections 22a and 22b are installed on top of the mold. These sections are normally held in place by a plurality of screws 50 which pass through the thickened mold patch body portion 24.

It will readily be appreciated by those skilled in the art that a mold constructed along the lines heretofore described constitutes an important contribution in the glass container production field since not only has the expense formerly associated with the frequent replacement of the mold patch plus the loss of production resulting from shutting down the machine has been greatly reduced but also the efficiency of the entire glass making process is increased because a more constant tonnage pull from the glass melting furnace can be maintained.

While the invention has been disclosed in conjunction with a specific form and disposition of the parts, it should be expressly understood that numerous modifications and changes may be made therein without departing from the scope of the appended claims, for example, the support element may comprise a generally cylindrically-shaped member having a convex curvilinear surface on one or both ends thereof.

What I claim is:

1. A mold for use in a glass container forming machine in which a blow head forcibly strikes the mold, comprising a mold body having a blow opening, a wear element secured to the blow head striking portion of said mold body, the portion of said wear element adjacent to said mold opening being spaced from said mold body to provide a venting chamber, a plurality of spacing elements disposed within the space between said wear element and said mold body adjacent to said mold opening whereby said spacing is maintained when the blow head strikes the wear element, and venting means connecting said venting chamber with the exterior of said mold body.

2. A mold for use in a glass container forming machine in which a blow head forcibly strikes the mold, comprising a mold body having a blow opening and a recess spaced from said opening, a wear element engaging said recess and secured to the blow head striking portion of said mold body, the portion of said wear element adjacent to said mold opening being spaced from said mold body to provide a venting chamber, a plurality of spacing elements disposed within the space between said wear element and said mold body adjacent to said mold opening whereby said spacing is maintained when the blow head strikes the wear element, and venting means connecting said venting chamber with the exterior of said mold body.

3. A mold for use in a glass container forming machine in which a blow head forcibly strikes the mold, comprising a mold body having a blow opening and a substantially annular recess spaced from said opening, a wear element engaging said recess and secured to the blow head striking portion of said mold body, the portion of said wear element adjacent to said mold opening being spaced from said mold body to provide a venting chamber, a plurality of spacing elements disposed within the space between said wear element and said mold body adjacent to said mold opening whereby said spacing is maintained when the blow head strikes the wear element, and venting means connecting said venting chamber with the exterior of said mold body.

4. A mold for use in a glass container forming machine in which a blow head forcibly strikes the mold, comprising a mold body having a blow opening and a recess spaced from said opening, a wear element engaging said recess and secured to the mold body so as to form the blow head striking portion of said mold body, the portion of said wear element adjacent to said mold opening being spaced from said mold body to provide a venting chamber, a plurality of spacing elements disposed within the space between said wear element and said mold body adjacent to said mold opening whereby said spacing is maintained when the blow head strikes the wear element, and venting means connecting said venting chamber with the exterior of said mold body.

5. A mold for use in a glass container forming machine in which a blow head forcibly strikes the mold, comprising a mold body having a blow opening and a recess spaced from said opening, a wear element engaging said recess and secured to the mold body so as to form the blow head striking portion of said mold body, the portion of said wear element adjacent to said mold opening being spaced from said mold body to provide a venting chamber, a plurality of spherical spacing elements disposed within the space between said wear element and said mold body adjacent to said mold opening and partially recessed within sockets in said mold body to maintain said spacing when the blow head strikes the wear element, a plurality of radially-directed passages formed in said wear element and connecting with said venting chamber, and a plurality of aligned passages formed in said mold body, said aligned passages being in communicating relationship at one end thereof with the passages formed in said wear element and at the other end with the exterior of said mold body.

References Cited by the Examiner

UNITED STATES PATENTS

| 84,412 | 11/68 | Cooper | 65—370 |
|---|---|---|---|
| 736,790 | 8/03 | Scott | 65—369 |
| 920,622 | 5/09 | Nester | 65—361 |
| 1,529,365 | 3/25 | Middendorf | 65—369 X |

DONALL H. SYLVESTER, *Primary Examiner.*